United States Patent [19]

Suzuki et al.

[11] Patent Number: 5,021,817
[45] Date of Patent: * Jun. 4, 1991

[54] AUTOMATIC FOCUSING CAMERA

[75] Inventors: Noboru Suzuki; Shigeo Toji, both of Tokyo, Japan

[73] Assignee: Asahi Kogaku Kogyo Kabushiki Kaisha, Tokyo, Japan

[*] Notice: The portion of the term of this patent subsequent to Aug. 1, 2006 has been disclaimed.

[21] Appl. No.: 565,176

[22] Filed: Aug. 10, 1990

Related U.S. Application Data

[63] Continuation of Ser. No. 340,079, Apr. 18, 1989, abandoned, which is a continuation of Ser. No. 148,699, Jan. 26, 1988, Pat. No. 4,853,732.

[30] Foreign Application Priority Data

Feb. 3, 1987 [JP] Japan .................................. 62-21713

[51] Int. Cl.$^5$ .............................................. G03B 13/36
[52] U.S. Cl. .................................. 354/402; 354/195.1; 354/286
[58] Field of Search ...................... 354/400, 402, 195.1, 354/286

[56] References Cited

U.S. PATENT DOCUMENTS

| | | | |
|---|---|---|---|
| 4,445,767 | 5/1984 | Kawazoe | 354/195.1 |
| 4,609,274 | 9/1986 | Iwashita et al. | 354/400 |
| 4,684,232 | 8/1987 | Kazami | 354/400 |
| 4,734,730 | 3/1988 | Ootsuka et al. | 354/402 |
| 4,737,812 | 4/1988 | Hasegawa et al. | 354/286 |

Primary Examiner—Russell E. Adams, Jr.
Attorney, Agent, or Firm—Sandler, Greenblum & Bernstein

[57] ABSTRACT

An automatic shutter driving device releasable when the image of a subject is sharply focused comprises a mode selection switch, enable-signal generating means, logic circuit, and a shutter driving circuit. The mode selection switch is mounted on a camera body having an automatic focusing function and selects at least a single mode of another mode, such as a continuous servo mode or a manual mode. The enable-signal generating means generates an enable-signal when the mode selection switch selects the single mode after a photographic lens having no automatic focusing function has been mounted on the camera body. The logic circuit executes the logic operations of the enable signal and a detection output signal derived from a decision means for deciding whether the image of a subject is sharply focused or out-of-focus, thereby delivering a shutter driving signal. The shutter driving circuit drives a shutter in response to the shutter driving signal derived from the logic circuit.

14 Claims, 6 Drawing Sheets

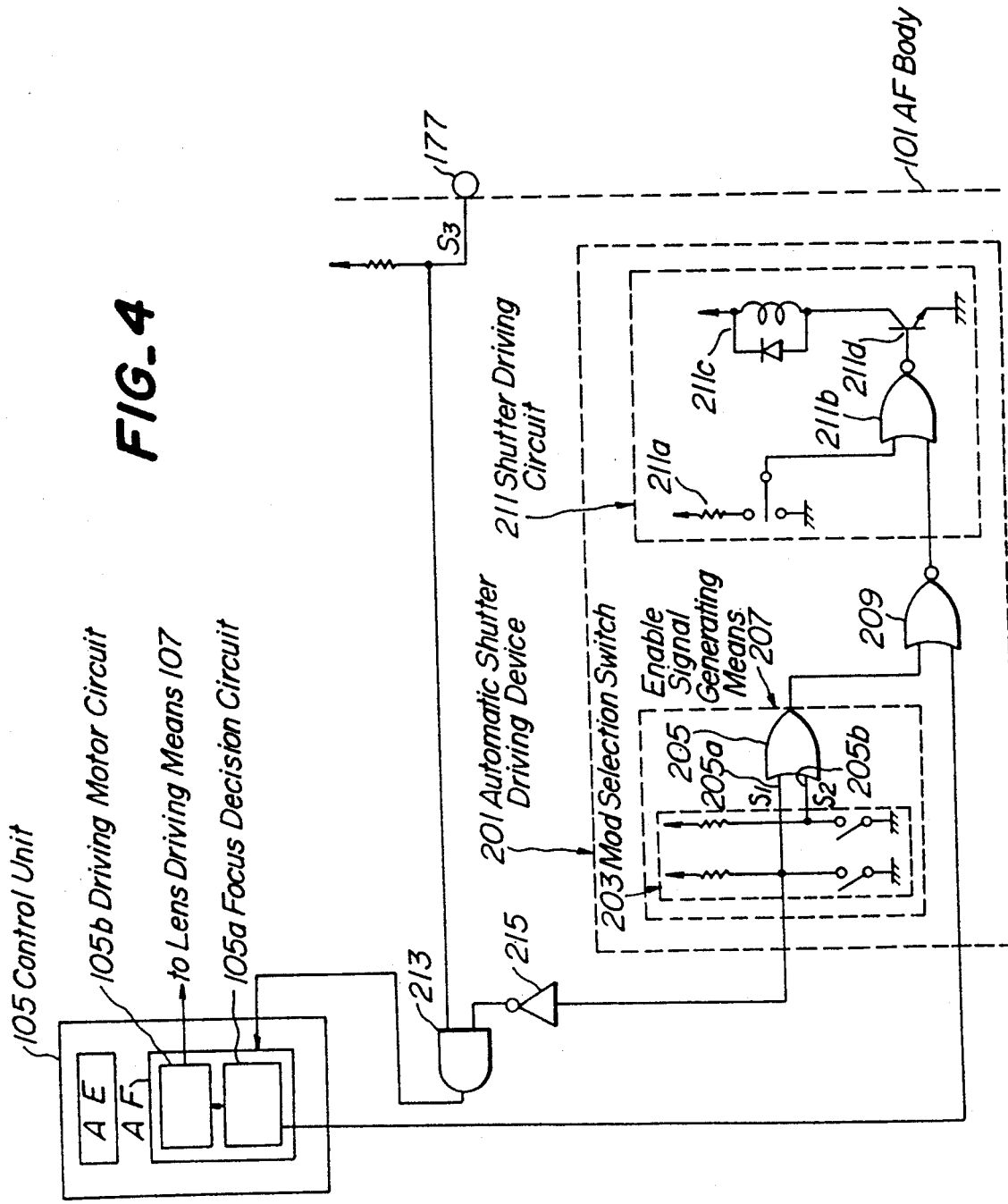

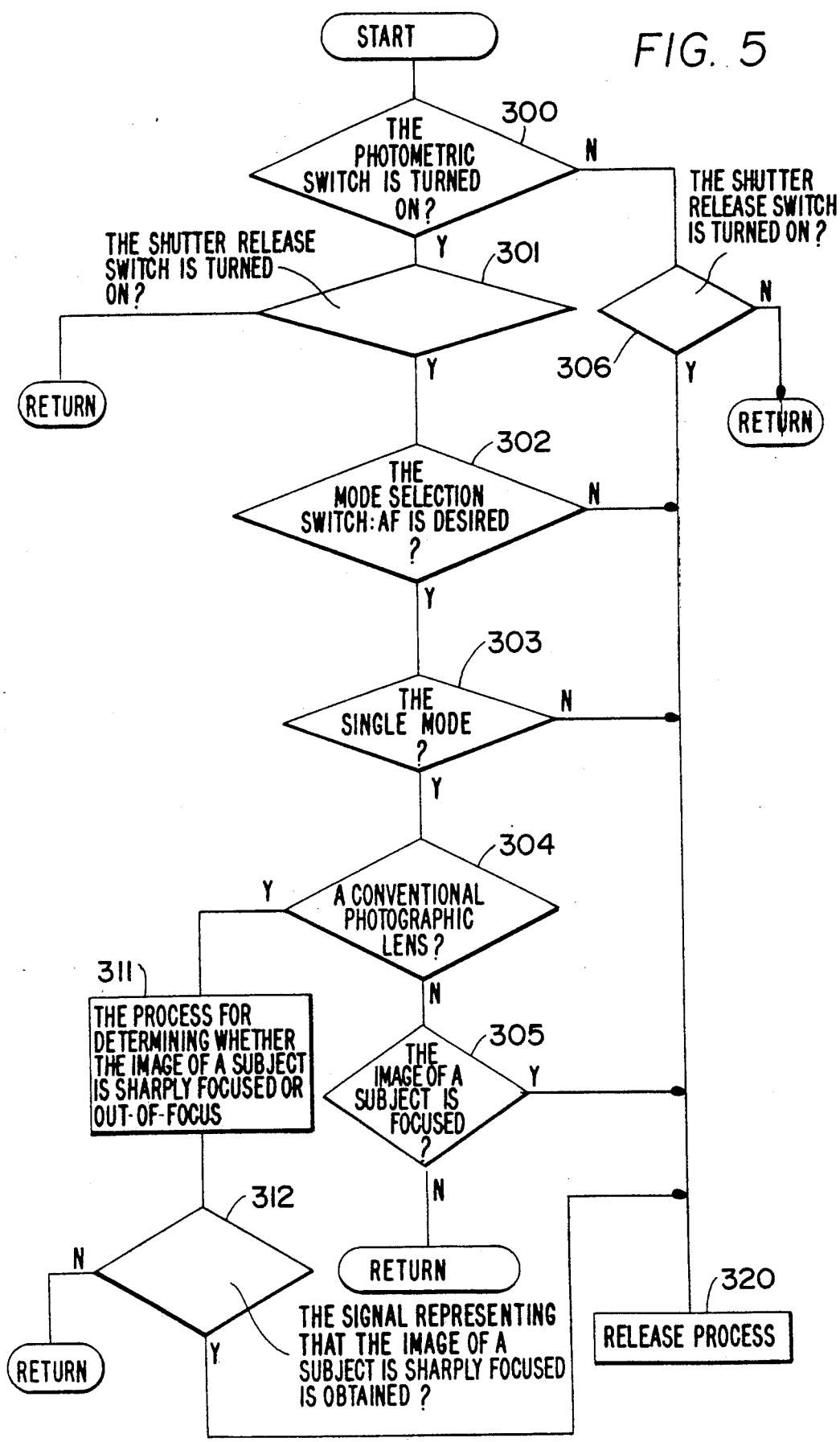

AUTOMATIC FOCUSING CAMERA

This application is a continuation of application Ser. No. 07/340,079, filed Apr. 18, 1989, now abandoned, which is a continuation of application Ser. No. 07/148,699 filed Jan. 26, 1988, now U.S. Pat. No. 4,853,732.

BACKGROUND OF THE INVENTION

The present invention relates to an automatic shutter driving device adapted to be energized when the image of a subject or object is sharply focused (to be referred to as an "automatic shutter driving device" hereinafter for brevity) which is adapted to be mounted on equipment having the function of automatically focusing, such as an automatic-focusing camera (to be referred to as an "AF camera" and which automatically drives a shutter when a subject reaches or appears at a position at which the subject is focused sharply known as "snap-in-focusing".

Recently, there have been devised and demonstrated various cameras capable of using one of a plurality of interchangeable lens and equipped with a function of automatically focusing a subject (to be referred to as an "AF function" hereinafter in this specification for brevity).

A camera body for such AF camera (to be referred to as an "AF body" hereinafter) is disclosed, for example, in U.S. patent application Ser. No. 103,311, filed on Oct. 1, 1987 by the same applicant.

When a photographic lens having the ability of performing an automatic focusing (to be referred to as the "AF lens" is mounted on the AF body, it becomes possible not only to perform automatic exposure controlled photography (to be referred to as the "AE" and automatic focusing photography. When a conventional photographic lens without the capability of performing automatic focusing (to be referred to as "conventional photographic lens" is mounted on the AF body, it becomes possible to AE photography.

To better understand of the present invention, the construction and mode of operation of the AF body mounted with an AF lens or a conventional photographic lens will be described briefly hereinafter.

FIG. 1 is a block diagram of a camera consisting of an AF body and an AF lens mounted thereon and reference numeral 101 represents the AF body.

AF body 101 comprises a control unit 105 for controlling the AF or AE function as well as other functions of a camera, an image unit 106 which serves to decide whether the image of a subject is sharply focused or out of focus and lens driving means 107 for shifting one or more lens elements within an AF photographic lens 71. In addition, the mount of the camera body 101 is provided with a plurality of electrical contacts 175a, 175b, 175c, 177, 179a, 179b and 181 used for exchange information between the camera body 101 and the photographic lens 71 which is electrically connected to predetermined contacts, disposed in the control unit 105.

An AF lens 71 which is adapted to be mounted on the above-mentioned AF body 101 is disclosed, for instance, in U S. patent application Ser. No. 103,311 filed by the same applicant in which reference numeral 71 in FIG. 1 represents the AF lens.

With the camera having the above-described construction, light rays from a subject, part of which is transmitted through the AF lens 71, is focused at the image unit 106. In response to the information delivered from the image unit 106, control unit 105 obtains a degree of out-of-focus of the focused image and compares it with a reference value, thereby deciding whether the image of the subject is sharply focused or out of focus. In this case, the control unit 105 provides a focus-detection signal which is representative of whether the image is sharply focused or out of an focus. In case of out-of-focus, condition the control unit 105 obtains a distance over which one or more movable lens elements 87 must be shifted so that the image of the subject can be sharply focused In response to the displacement thus determined, lens means 107 shifts one or more movable lens elements 87 to a position at which the image of the subject is sharply focused. In this case, the driving lens force of the driving means 107 is transmitted to one or more movable lens elements 87 through a driving force transmission means 89 incorporated in the AF lens 71. Other information required for AE and AF photography is exchanged between the body and the lens through predetermined electrical contacts, so that desired AE or AF photography can be accomplished.

In FIG. 1, reference numeral 73 represents a lens ROM in which is stored information inherent to the AF lens 71 and switching or selection means 83 which turns on or off the lens ROM depending upon whether the camera body has the AF function or not and which, in the case of an "OFF" state, delivers information, such as a F-number determined by transistors $Tr_1$–$Tr_3$, as the inherent information of the photographic lens. Reference numeral 88 represents one or more lens elements in the photographic lens 71 which is different from the movable lens elements 87.

FIG. 2 is a schematic block diagram of a camera consisting of the AF body 101 and a conventional photographic lens mounted thereon. In FIG. 2, reference numeral 15 represents a conventional photographic lens.

In the case of an AF camera with the above-mentioned construction, an electrical signal representative of the mounting of the conventional photographic lens 15 is generated by utilizing the fact that the electrical contact 177 on the side of the AF body 101 is made into direct contact with the conventional photographic lens mount so that it becomes possible to accomplish AE photography by using the conventional lens 15.

In the case consisting of the conventional photographic lens 15 mounted on the AF body, 101 it is possible to accomplish AE photography; but there is a problem in that the AF function of the AF body is not positively utilized except to provide a focus indication.

If the camera shutter is driven or released in response to a decision signal representative of a sharply focused image of a subject (to be referred to as a "decision signal") even when the conventional photographic lens is mounted on the AF body, it is advantageous for camera users because not only macro-photography but also photography in coincidence with a desired shutter release can be accomplished.

SUMMARY OF THE INVENTION

In view of the above, one of the objects of the present invention is to provide an automatic shutter driving or releasing device which overcomes the above and other problems and can automatically drive the shutter, especially in the case of the snap-in-focus, even when a conventional photographic lens is mounted on the AF body.

Another object of the present invention is to improve the performance of the automatic focusing device.

In order to achieve the above and other objects, according to the present invention, the automatic shutter driving device 201 is characterized by comprising a mode selection switch which is mounted on a camera body having the AF function and is adapted to select at least a single mode or another mode, such as a manual mode or continuous servo mode; an enable signal generator for generating an enable signal when the single mode is selected by the mode selection switch after a conventional lens having no AF function has been mounted on the camera body; a logic circuit for carrying out a logic operation of the enable signal and a decision signal derived from a decision means for deciding whether the image of a subject is sharply focused or out-of-focus, thereby generating a shutter driving or releasing signal; and a shutter driving circuit for driving or releasing a shutter in response to the output signal delivered from the logic circuit.

Therefore, when the image of a subject is sharply focused, the shutter is automatically driven or released so that a kind of AF photography becomes possible, even when a conventional photographic lens having no AF function is mounted on the AF body.

The present invention will be more apparent from the following description of a preferred embodiment thereof taken in conjunction with the accompanying drawings.

BRIEF DESCRIPTION OF THE DRAWINGS

FIG. 4 shows a circuit diagram of the automatic shutter driving device in accordance with the present invention incorporated into an AF body;

FIG. 5 is a flowchart used to explain the mode of operation of the automatic shutter driving device in accordance with the present invention.

DETAILED DESCRIPTION OF THE PREFERRED EMBODIMENTS

Figure 1:
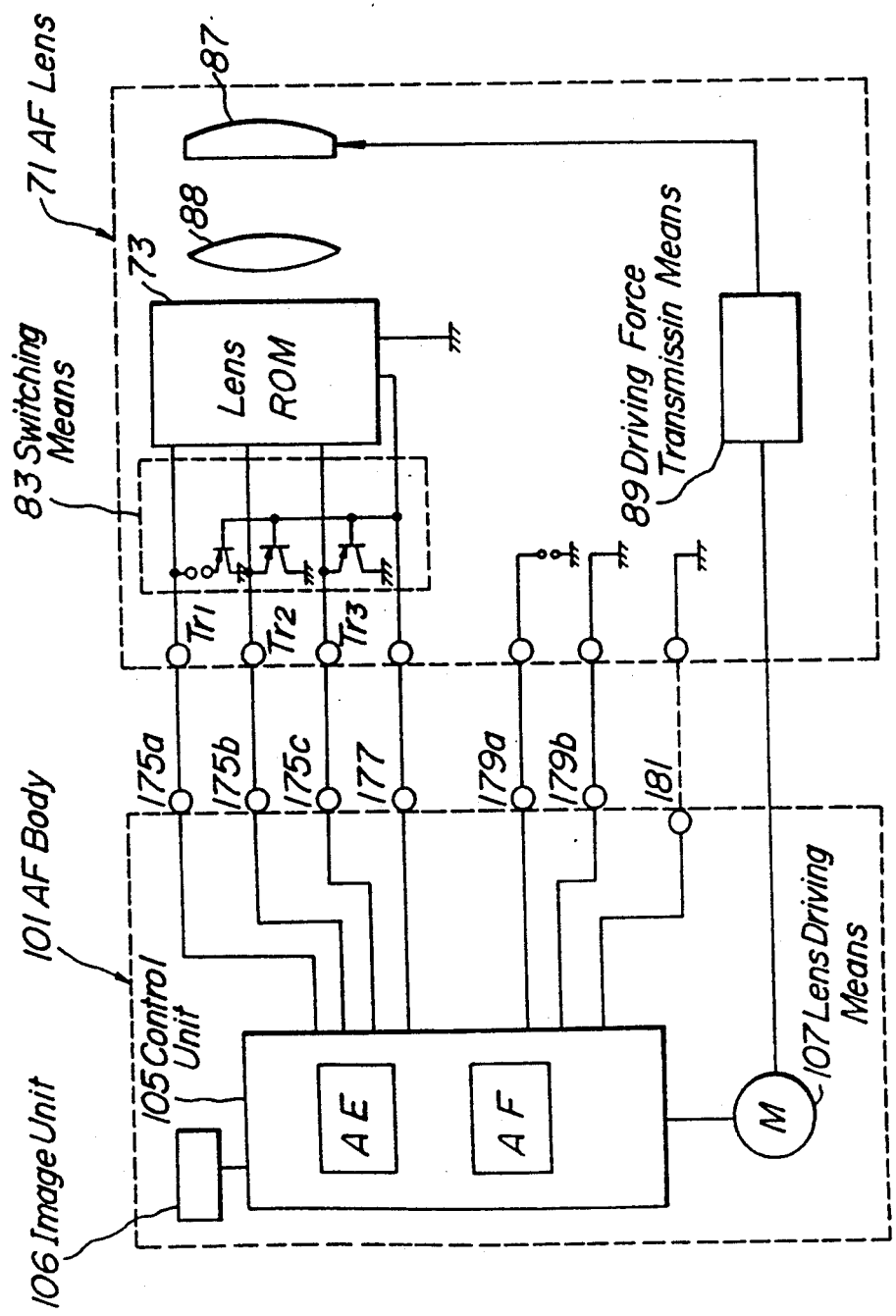
FIGS. 1 and 2 are schematic diagrams illustrating the constructions of the camera, their being used to explain the present invention and the prior art camera, respectively.

The attached drawings schematically shows a preferred embodiment to permit the better understanding of the present invention. Dimensions, shapes and arrangements of various component parts are not limited to those shown. In addition, same reference numerals are used to designate similar parts through out the figures and the component parts which are substantially similar in construction to those described above and which are designated by the same reference numerals will not be described in detail.

In the case of the AF camera comprising the AF body 101 and the AF lens 71 mounted thereon which has been described in detail hereinbefore with reference to FIG. 1, in order to accomplish (1) single mode exposure, (2) servo mode exposure and (3) manual mode exposure to be described hereinafter, a program for accomplishing each photographic mode is stored in the control unit 105 of the AF body 101. In this case, in order to select a desired photographic mode, the AF body is provided with a mode selection switch 203

The single mode exposure in exists when the image of a subject is sharply focused, the and shift of one or more photographic lens elements is stopped and the shutter is ready to be released. This is a focus-priority mode, in which the subject's distance is measured by depressing the shutter release button halfway The lens is then driven to the in-focus position and the focus is locked The shutter button can be released by depressing the shutter release button all the way down. It is designed this way so that the shutter can not be released unless the subject is in-focus, preventing out-of-focus images.

The continuous servo mode (referred to as the "servo mode") is where one or more movable lens elements are shifted to follow a subject in such a way that the image of the subject can be always kept sharply focused. This is a shutter-release-priority mode, in which focusing is continuously adjusted to the subject as long as the shutter release button is depressed halfway. Unlike the AF single mode, the shutter can be released at any time, making it ideal for use when pursuing a mobile or moving subject.

The manual mode is where the image of a subject is sharply focused by operating a focusing by a user ring; an alarm signal is generated or an alarm mark is displayed so that the user can detect that the image of the subject is sharply focused (referred to as a focus indication).

Figure 2:
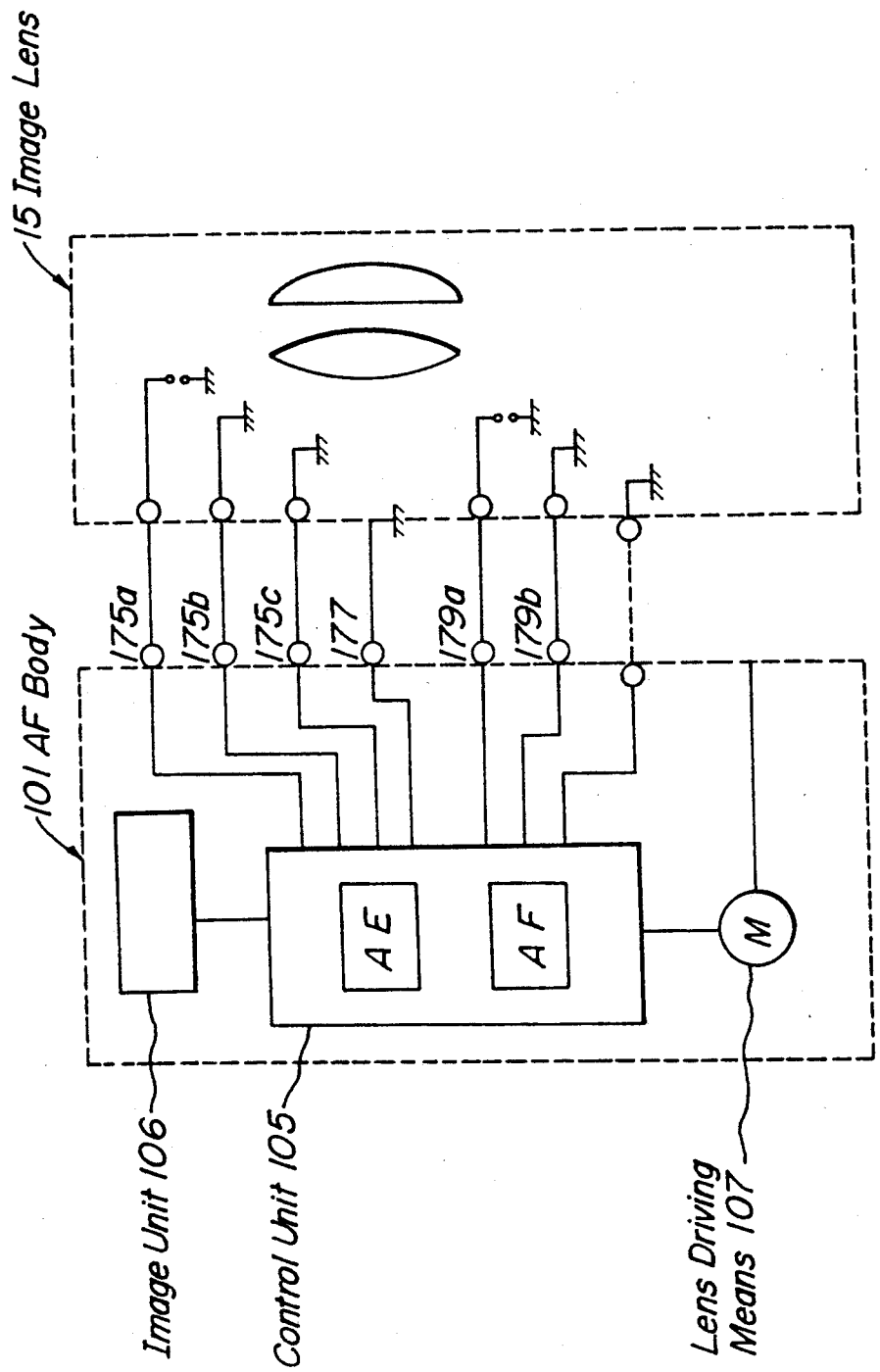

As described with reference to FIG. 2, the AF body 101 has the AF function; when a conventional photographic lens is mounted on the AF body, the operation of the lens driving means 107 is disabled. However, it is still possible to focus the image of a subject at the image unit 106 through the conventional photographic lens 15, and, therefore by a detection means for detecting whether the image of a subject is sharply focused or out of focus, which is composed of the image unit 106 and part of the control unit 15 as described above, it becomes possible in a simple manner to obtain a degree of out-of-focus of a subject, decide that the image is sharply focused and generate a detection signal representative of whether the image of the subject is sharply focused or out-of-focus When the camera has other additional functions, the above-mentioned mode selection switch can be used as a means for generating a signal for selecting a specific function, and the detection signal is used as a signal for enabling or disabling a selected function. The automatic shutter driving device in accordance with the present invention is so designed and constructed that the mode selection switch and the detection signal can be utilized.

Figure 3A:
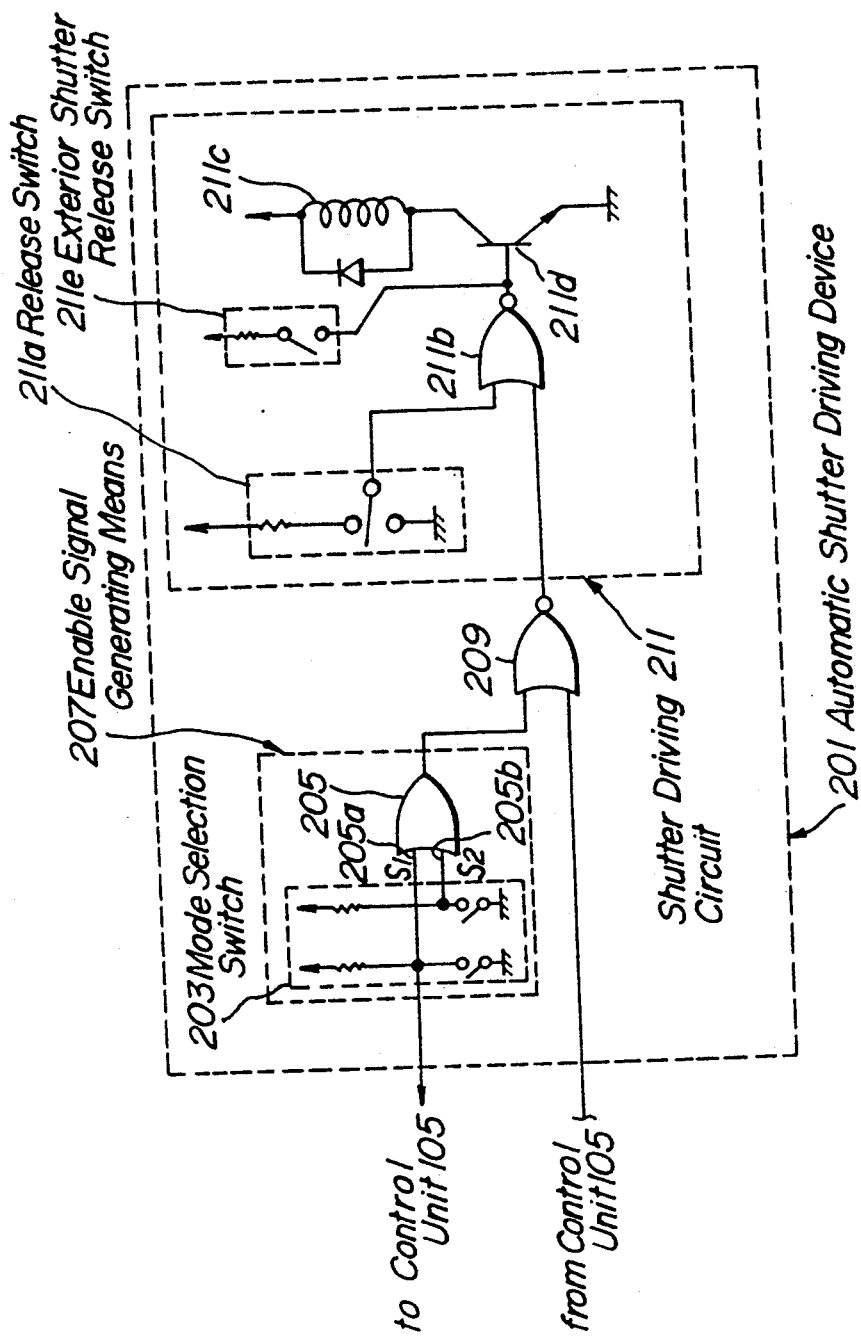
FIG. 3A is a schematic circuit diagram of a preferred embodiment of an automatic shutter driving device adapted to be energized when the image of a subject (object) is sharply focused.

Referring now to FIG. 3A, the construction of the automatic shutter driving device 201 will be described. FIG. 3A is a circuit diagram illustrating one embodiment of the automatic shutter driving device in accordance with the present invention.

In the automatic shutter driving device 201 of FIG. a mode selection switch 203 is disposed at a suitable portion of the AF body 101 and is manually operated by a photographer to select a desired exposure mode. It is preferable that the mode selection switch is manually caused to slide to select the single mode or the servo mode and, in the case of the selection of the manual mode, must be once pushed and then caused to slide so that the erroneous selection of the manual mode is avoided when the single or servo mode is selected.

The mode selection switch 203 generates a two bit signal and consists of two series circuits, each of which consists of a resistor and a switching element and which are disposed in parallel with each other. The switching elements may be of the mechanical type, the electronic type or the optical type. The mode selection output signals are applied to the input terminals of a two-input OR gate 205. At least one output signal, for example, $S_1$ generated in response to the manual operation of the mode selection switch 203, is also transmitted to the control unit 105 (see FIG. 3B) having the functions described above so that either the single mode, the servo mode or the manual mode is selected. In this embodiment, the combinations of the signal $S_1$ applied to one input terminal 205a of the OR gate 205 and another signal $S_2$ applied to the other input terminal 205b as shown in TABLE 1 select the single mode, the manual mode or the servo mode.

TABLE 1

| Mode | $S_1$ | $S_2$ |
|---|---|---|
| Single | 0 | 0 |
| Manual | 1 | 0 |
| Servo | 0 | 1 |
| Not used | 1 | 1 |

In the present embodiment, the mode selection switch 203 and the OR gate 205 constitute an enable-signal generating means 207 of the automatic shutter device, but it is to be understood that the present invention is not limited thereto and that the mode selection switch 203 may be arranged independently of the enable-signal generating means 207. The output terminal of the enable-signal generating means 207 in an (that is the output terminal of the OR gate 205) is connected to a shutter driving circuit 211, to be described hereinafter.

A NOR gate 209 is provided which performs logic operation of the enable signal and the detection signal from the decision circuit, thereby generating a shutter driving signal. One input terminal of the NOR gate 209 is connected to the output terminal of the enable-signal generating means 207 while a second input terminal thereof is connected to a detection signal output terminal of the control unit 105.

The shutter driving circuit 211 of the preferred embodiment comprises a release switch 211a mounted on the camera body, a NOR gate 211b, an electromagnetic relay 211c and a transistor 211d for driving the relay 211c. A signal line from the release switch 211a is connected to one of the input terminals of the NOR gate 211b while the output terminal of the NOR gate 209 is connected to a second input terminal of the NOR gate 211b. In response to the output signal derived from the NOR gate 211b, transistor 211d is turned on or off so as to open close the shutter. Conventional camera bodies have an exterior shutter release terminal and when the exterior shutter release terminal is connected to an exterior shutter release switch 211e, the latter becomes one of the component parts of the driving circuit 211. The exterior shutter release switch 211e is connected to the output terminal of the NOR gate 211b so that in response to the output signal derived from the exterior shutter release switch 211e, the shutter is released or driven, instead of being driven by the output signal derived from the NOR gate 211b.

Figure 3B:
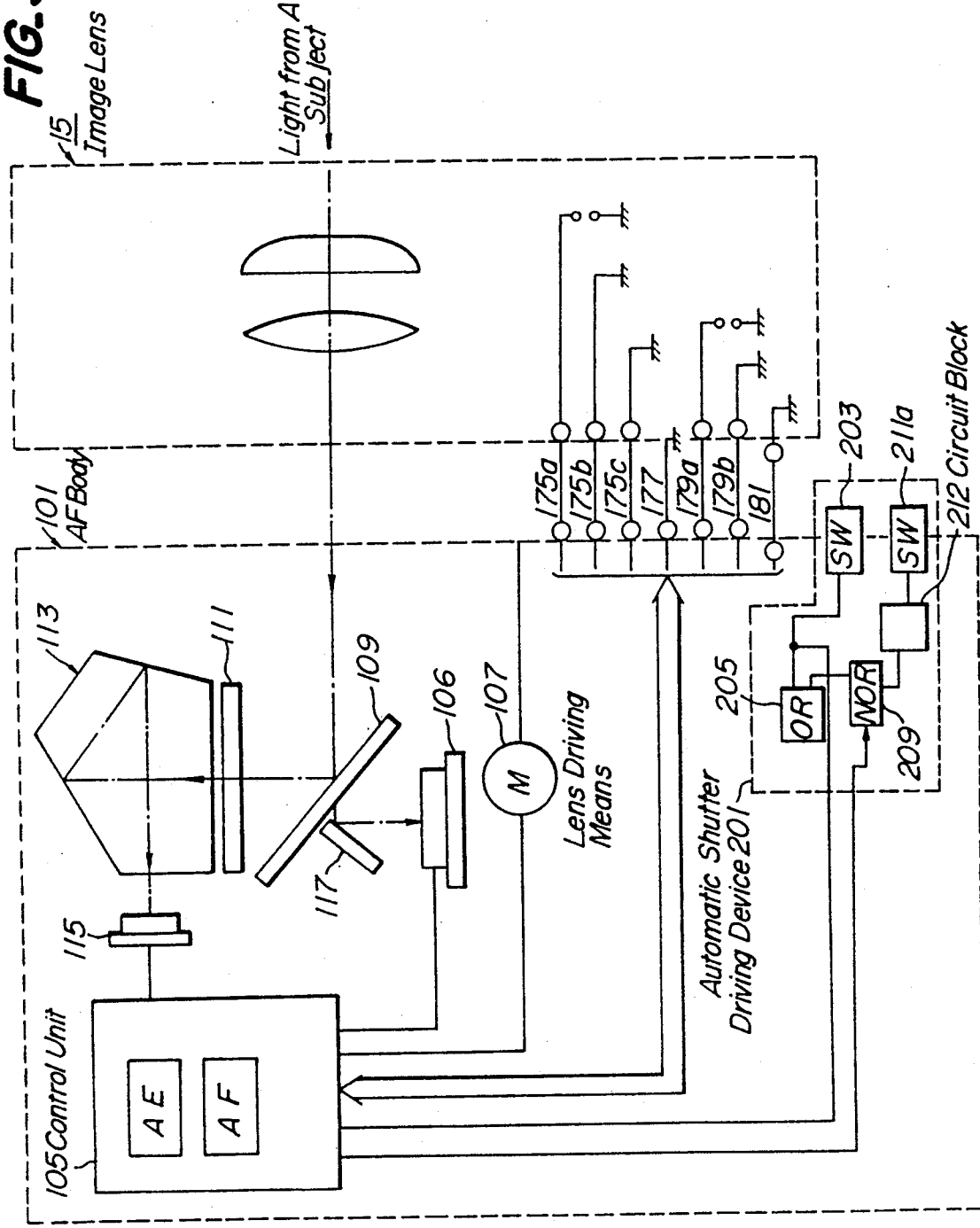
FIG. 3B is a block diagram illustrating that the automatic shutter driving device in accordance with the present invention incorporated into a camera body having the AF function.

FIG. 3B shows a schematic block diagram illustrating the AF body 101 which incorporates the automatic shutter driving device 201 of the type described above and on which is mounted a conventional photographic lens 15. FIG. 3B shows the conventional construction of the AF body 101 in detail, in which the component parts 211b, 211c, 211d and 211e described above with reference to FIG. 3A are shown as a block 212 and the component parts 203 and 207 are not shown.

The AF body 101 must be so designed and constructed that it can perform all AF functions or utilize only the function for deciding whether the image of a subject is sharply focused or out-of-focus (the decision function) while disabling the lens driving means 107, depending upon the combination of the type of photographic lens 15 and one of the exposure modes selected by the mode selection switch 203.

One example of the constructions of the AF bodies will be described hereinafter with reference to FIG. 4.

In FIG. 4, reference numeral 177 designates the electrical contact for detecting the type of a photographic lens mounted to the AF body 101 as described above. More particularly, when the potential at the contact 177 is "1", it indicates that an AF photographic lens is mounted on the AF body, but when the potential is "0", it indicates that a conventional photographic lens is mounted. The electrical contact 177 is connected to one of the input terminals of a two-input AND gate 213 while one-bit information of the mode selection signal or the information delivered to one terminal 205a of the gate 205 is applied through a NOT gate 215 to the other input terminal of the AND gate 213. The AF function unit in the control unit 105 generally comprises a focus decision circuit 105a and a driving motor circuit 105b.

The output signal derived from the AND gate 213 varies in response to the output signal $S_3$ derived from the electrical contact 177 and one signal component $S_1$ of the mode selection signal.

In this case, in response to the output signal from the AND gate 213, the control unit 105 is switched to the AF function for obtaining a sharply focused image of a subject by moving one or more lens elements by the driving motor circuit 105b which is energized in response to the output signal derived from the decision circuit 105a or to the focus decision function for enabling only the decision circuit 105a while de-energizing the driving means 107. The control unit 105 is so designed and constructed to accomplish the function of deciding whether the image of a subject is sharply focused or out-of-focus in response to the voltage representative of the logic "0" at the output terminal of the AND gate 213. In the circuit as shown in FIG. 4, when an AF lens is mounted on the AF body, and only when the single or servo mode is selected, the voltage representative of the logic "1" appears at the output terminal of the AND gate 213 so that the camera is switched into the AF function mode.

On the other hand, when a conventional photographic lens is mounted and when the single mode is selected, the voltage representative of the logic "1" appears at the output terminal of the AND gate 213, the detection signal representative of a sharply focused image is derived from the control unit.

As described above, when a conventional photographic lens having no AF function is mounted, the electrical terminal 177 is grounded and delivers the voltage representative of the logic "0" so that the contact 177 is a contact having a function to detect whether a conventional photographic lens is mounted or not. When a conventional photographic lens is mounted and when the single mode is selected, the combination circuit consisting of the electrical contact 177, the AND gate 213 and the NOT gate 215 enables only the decision circuit 105a in the AF function unit.

Referring next to FIG. 3B and FIG. 5, the mode of operation of the automatic shutter driving device 201 in accordance with the present invention will be described. FIG. 5 is a flowchart of the program stored in the control unit 105. of the AF body 101 in the case of the operation of the automatic shutter driving device 201.

In general, in the case of an AF camera, when the shutter release switch on the camera body is pushed halfway, the photometric switch is turned on and the brightness of a subject is measured, and at the same time or after then, the focusing operation is accomplished. When the shutter release switch is completely depressed, the shutter is released regardless of whether an image of a subject is sharply focused or out-of-focus. However, in the case of the AF camera incorporating the automatic shutter driving device 201 in accordance with the present invention, even if the shutter release switch is completely depressed, but a photometric switch remains in the "ON" state, the shutter is not released until a sharply focussed image of a subject is obtained; that is, the shutter is released when and only when the image of a subject is sharply focused.

Whether or not the photometric switch is turned on is detected (Step 300) and when it is detected that the photometric switch is turned on, a determination is made of whether or not the shutter release switch 211a is turned on (Step 301). In this case, it should be noted that the shutter release switch 211a is turned on when it makes contact with an earth terminal.

When it is detected that the shutter release switch is turned on, it is determined what exposure mode is selected (Step 302). In this case, the AF mode (single and servo modes) or the manual mode is detected (Step 302). When the mode detected in step 302 is the manual mode, the shutter release process is executed so that the shutter is released. (Steps 302 and 320). Further, when the AF mode is detected, it is determined whether the single mode or servo mode is selected. In the case of the servo mode, the shutter release process is executed so that the shutter is released In this mode, during the halfway depressed position of the shutter release button, focusing is continuously adjusted an the subject such, for example, a moving one and accordingly the shutter can be released at any time without any readjusting of the focusing by re-depressing the shutter release button halfway (Steps 303 and 320) In the case of the single mode, whether an AF lens or a conventional photographic lens is mounted is detected (Step 304). When it is detected that an AF lens is mounted and when the image of a subject is sharply focused, the shutter release process is executed so that the shutter is released. In this mode, the focussing is not continuously adjusted to the subject during the halfway depressed position of the shutter release button. Therefore, to prevent out-of-focus images, the focusing should be readjusted to the subject by depressing the shutter release button halfway prior to every releasing of the shutter (Steps 304, 305 and 320).

When it is detected in step 304 that a conventional photographic lens is mounted, the control unit 105 selects the function for determining whether the image of a subject is sharply focused or out-of-focus (Step 311) as has already been explained with referring to FIG. 4.

Under these conditions, the automatic shutter driving device 201 remains in the state where it waits for the arrival of the detection signal representative of a sharply focused image and upon arrival of the detection signal, the shutter release process is executed so that the shutter is released (Steps 312 and 320).

During such waiting period, light rays from a subject, passed through a photographic lens is directed to a main mirror 109 (FIG. 3B) and redirected to pass through a focusing screen 111, a pentagonal prism 113 and other optical elements so that the brightness of the subject is measured by a photosensor 115. Thus, part of the information required for the AE exposure is delivered to the control unit 105. Furthermore, part of the light rays transmitted through the photographic lens 15 is redirected by a sub-mirror 117 to the image unit 106.

In this case, for example, one of the following operations is carried out:
 (a) A photographer rotates a focusing ring to sharply focus the image of a subject;
 (b) The camera is moved toward a subject while the focusing ring remains at a predetermined angular position; or
 (c) A subject is moved toward the camera whose focusing ring is held in the stationary state.

During these operations, the image of a subject is sharply focused. Then the control unit 105 delivers the signal representing that the image of a subject is sharply focused to the arithmetic-logic circuit or NOR gate 209 in the automatic shutter driving device 201 so that the shutter is released at the instant when the image of a subject is sharply focused, whereby a desired picture can be obtained.

However, sometimes it is desired to use the exterior release switch 211e (see FIG. 3A) instead of the release switch 211a incorporated in the camera body to release the shutter. The exterior shutter release switch 211e is different from the above mentioned shutter release switch 211a and it is assumed that the exterior shutter release switch 211e has no function of turning on the photometric switch. In this case, the detection whether the image of a subject is sharply focused or out-of-focus for the sake of the snap-in-focusing is not needed. For instance, when the exterior shutter release switch 211e is connected to the camera body, the shutter release switch 211a is connected to a power supply so that shutter release process is executed by the exterior shutter release switch 211e prior to the snap-in-focusing. In this case, according to the flowchart shown in FIG. 5, when it is detected that the photometric switch is not turned on (Step 300), it is detected whether or not the shutter release switch is turned on (Step 306). When it is detected that the shutter release switch is turned on, the shutter release process is executed to release the shutter.

As described above, according to the present invention, not only AF exposure but also a kind of AE exposure can be accomplished by using a camera consisting of a conventional photographic lens and the AF body.

Next, some of the practical use of the automatic shutter driving device in accordance with the present invention will be described so that the present invention may be more apparently understood.

In the case of macro-photography, the focusing ring is held in the stationary state while the camera is moved toward or away from a subject. In this case, when the image of the subject is sharply focused, the shutter is automatically released. Thus, according to the present invention, macro-photography is greatly facilitated.

Furthermore, it is assumed that a subject appears at an expected position In this case, the focusing ring is rotated so that the expected position is sharply focused. Then, when the subject appears at the expected position, its image is sharply focused and therefore the shutter is automatically released whereby a picture in coincidence with a desired shutter releasing chance can be obtained in a very simple manner.

It is to be understood that the present invention is not limited to the above described preferred embodiment. For instance, the construction of the shutter driving device is not limited to the one shown in FIG. 3A, and other hard and soft arrangements can be employed within the spirit and scope of the present invention.

So far, the present invention has been described wherein the automatic shutter driving device is incorporated into a camera comprising an AF body and a conventional photographic lens, but it is apparent that the present invention may be equally applied to AF cameras themselves.

As is apparent from the above description, according to the automatic shutter driving device adapted to be energized when the image of a subject is sharply focused in accordance with the present invention, it becomes possible to automatically release the shutter as needed when the image of a subject is sharply focused, even when a conventional photographic lens is mounted on a body having the AF function. Therefore, in addition to the AE exposure function, the function of releasing the shutter when the image of a subject is sharply focused can be attained.

While the invention has been particularly shown and describes with reference to preferred embodiments thereof, it will be understood by those skilled in the art that the foregoing and other changes in form and details can be made therein without departing from the spirit and scope of the invention.

What is claimed is:

1. An autofocus camera that accepts a plurality of lenses, comprising:
   a camera body, said camera body having a mode selection switch for selecting a first mode of operation in which when an image of a subject is sharply focused, the shifting of one or more photographic lens elements is stopped and a shutter is ready to be released, or a second mode of operation in which one or more movable photographic lens elements are shifted to follow a subject in such a way that the image of said subject is always kept sharply focused;
   means for detecting whether or not said lens, mounted on said camera body, is in a condition incapable of an autofocus operation;
   means for generating an enable-signal when said mode selection switch selects said first mode of operation and said lens mounted on said camera body is in a condition incapable of an autofocus operation;
   a logic circuit for executing logic operations of said enable-signal and a detection output signal, said detection output signal being derived from a decision means for deciding whether the image of the subject is sharply focused or out-of-focus, said logic circuit producing a shutter driving signal when said image is focused; and
   a shutter driving circuit for driving a shutter in response to said shutter driving signal derived from said logic circuit.

2. The camera of claim 1, wherein said mode selection switch consists of a combination of resistors and switching elements interconnected between a power supply and ground to generate a two-bit mode selection signal.

3. The camera of claim 1, wherein said detection means comprises an electrical contact mounted on said camera body, and an AND gate for obtaining an AND output by the AND operation of an output signal derived from said electrical contact and an output signal derived from said mode selection switch, said electrical contact output signal indicating whether an autofocus lens or a non-autofocus lens is mounted to said camera body.

4. The camera of claim 3, wherein said detection means delivers said output signal in response to which said automatic focusing function is interrupted and only said decision circuit is actuated when a photographic lens having no automatic focusing function is connected to said electrical contact and said mode selection switch selects said first mode.

5. The camera of claim 1, wherein said enable-signal generating circuit comprises said mode selection switch and an OR gate for obtaining an OR output of a two-bit information derived from said mode selection switch.

6. The camera of claim 1, wherein said enable-signal generating circuit comprises an OR gate for obtaining an OR output of a two-bit information derived from said mode selection switch.

7. The camera of claim 1, wherein said logic circuit is composed of a NOR gate.

8. The camera of claim 1, wherein said shutter driving circuit comprises a shutter release switch disposed in said camera body, a NOR gate for obtaining an output signal of the NOR operation of said signal from said logic circuit and said output from said shutter switch, and a switch which is energized in response to said output from said NOR gate.

9. The camera of claim 8, wherein said shutter driving circuit is so designed and constructed that when an exterior shutter release switch is attached to said camera body, said shutter driving circuit energizes said switch in preference to said output signal derived from said NOR gate.

10. The camera of claim 1, wherein said second mode of operation is selected from a group of a continuous serve mode and a manual mode.

11. The camera of claim 1, wherein said detection means comprises an electrical contact mounted on said camera body for obtaining a signal identifying whether an autofocus lens or non-autofocus lens is mounted to said camera body.

12. The camera of claim 8, wherein said switch is an electromagnetic relay.

13. The camera of claim 1, wherein said camera body has a shutter release switch and a lens having a condition incapable of an autofocus function, is provided with an external shutter release switch, wherein when said external shutter release switch is depressed said shutter is released regardless of whether said enable-signal has been generated.

14. A method for taking a focused picture with an autofocus camera having a non-autofocus lens mounted thereon, comprising the steps of:

selecting a first mode of operation for said camera wherein an autofocusing function is set to focus upon an image of a subject until it is sharply focused;

detecting whether or not said lens, mounted on said camera, is in a condition incapable of an autofocus function;

generating an enable-signal when said camera is set to said first mode of operation and said lens mounted on said camera is in a condition incapable of an autofocus function;

manually focusing a non-autofocus lens to a desired distance;

executing logic operations in said camera for deciding whether an image of a subject is sharply focused; and operating a shutter in response to a shutter driving circuit when said logic operations determine that an image has snapped into focus.

* * * * *

UNITED STATES PATENT AND TRADEMARK OFFICE
CERTIFICATE OF CORRECTION

PATENT NO. : 5,021,817
DATED : June 4, 1991
INVENTOR(S) : N. SUZUKI et al.

It is certified that error appears in the above-indentified patent and that said Letters Patent is hereby corrected as shown below:

On the Title Page:

In the Abstract, line 7, change "of" to ---or---.
In the Abstract, line 13, before "logic" delete "the".

Signed and Sealed this

Second Day of August, 1994

Attest:

BRUCE LEHMAN

*Attesting Officer*      *Commissioner of Patents and Trademarks*